(12) United States Patent
Heragu et al.

(10) Patent No.: US 8,301,431 B2
(45) Date of Patent: Oct. 30, 2012

(54) APPARATUS AND METHOD FOR ACCELERATING SIMULATIONS AND DESIGNING INTEGRATED CIRCUITS AND OTHER SYSTEMS

(75) Inventors: Keerthinarayan P. Heragu, Richardson, TX (US); Theodore W. Houston, Richardson, TX (US); Anand Seshadri, Richardson, TX (US); Hugh T. Mair, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 864 days.

(21) Appl. No.: 12/346,036

(22) Filed: Dec. 30, 2008

(65) Prior Publication Data
US 2009/0177451 A1 Jul. 9, 2009

Related U.S. Application Data

(60) Provisional application No. 61/019,020, filed on Jan. 4, 2008.

(51) Int. Cl.
*G06F 17/50* (2006.01)
(52) U.S. Cl. .......................................... 703/13; 703/14
(58) Field of Classification Search ................... 703/13, 703/14
See application file for complete search history.

(56) References Cited

U.S. PATENT DOCUMENTS 6,571,202 B1 * 5/2003 Loman et al. ................. 703/2
2005/0288918 A1 12/2005 Chen et al.

OTHER PUBLICATIONS

Khalil et al. "SRAM Dynamic Stability Estimation Using MPFP". Dec. 2007, IEEE ICM., 4 Pges.*
Anand Seshadri et al. "The Dynamic Stability of a 10T SRAM Compared to 6T SRAMs at the 32nm Node Using an Accelerated Monte Carlo Technique". Circuits and Systems Workshop: System-on-Chip—Design, Applications, Integration, and Software, 2008 IEEE, pp. 83-86, Oct. 19, 2008. Dallas, TX.

* cited by examiner

*Primary Examiner* — Eunhee Kim
(74) *Attorney, Agent, or Firm* — Rose Alyssa Keagy; Wade J. Brady, III; Frederick J. Telecky, Jr.

(57) ABSTRACT

A method of accelerating a Monte Carlo (MC) simulation for a system including a first component having a first input parameter and a second component having a second input parameter. The simulation model provided includes a first component model including a first model parameter corresponding to the first input parameter and a second component model having a second model parameter corresponding to the second input parameter. A first acceleration factor for the first component and a second acceleration factor for the second component are calculated based on at least the respective number of instances. A first scaled distribution is computed from the first distribution and a second scaled distribution is computed from the second distribution based on the respective acceleration factors. The MC simulation for the system is run, wherein values for the first model parameter value and second model parameter value are obtained based on the respective scaled distributions.

20 Claims, 4 Drawing Sheets

APPARATUS AND METHOD FOR ACCELERATING SIMULATIONS AND DESIGNING INTEGRATED CIRCUITS AND OTHER SYSTEMS

CROSS REFERENCE TO RELATED APPLICATION

This application claims the benefit of Provisional Application Ser. No. 61/019,020 entitled: "METHOD FOR ACCELERATING MONTE CARLO EVALUATIONS, AND CIRCUITS DESIGNED BY THIS METHOD", filed Jan. 4, 2008 which is herein incorporated by reference in their entirety.

FIELD OF THE INVENTION

The present invention relates generally to the field of simulation and more particularly methods and apparatus for accelerating simulation and designing integrated circuits and other systems.

BACKGROUND

Verification of a system design using simulation is typically performed to ascertain the reliability of the system before the system is constructed. In general, simulations of such systems are performed to see the influence of variability during a manufacturing process or during operation. As a result, a large number of simulations at varying conditions are typically performed to provide a desired level of confidence in the system design. For example, simulations are often performed for some integrated circuits and other types of systems to determine the reliability of the system as conditions vary. However, in many instances, the simulated failure rates for one or more portions of the system can be so low such that the number of simulation runs needed to view and analyze a reliability failure can be prohibitively large or can result in the simulation being of little or no utility.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

In one embodiment of the invention, a method of accelerating a Monte Carlo (MC) simulation of a system comprising at least first component having at least a first input parameter and at least a second component having at least a second input parameter is provided. The first input parameter varies according to a first distribution characterized by at least a first standard deviation, and the second input parameter varies according to a second distribution characterized by at least a second standard deviation. A simulation model is provided for the system. The simulation model comprises a first component model for the first component and a second component model for the second component. The first component model has a first model parameter corresponding to the input first parameter and a second component model having a second model parameter corresponding to the second input parameter.

A first acceleration factor based at least on a first number of instances of the first component in the system and a second acceleration factor based at least on a second number of instances of the second component in the system is obtained. A first scaled distribution is computed from the first distribution based on at least the first acceleration factor and a second scaled distribution is computed from the second distribution based on at least the second acceleration factor. The MC simulation for the system is run wherein values for the first model parameter value are generated based on the first scaled distribution and values for the second model parameter value are obtained based on the second scaled distribution. The first number of instances and the second number of instances are generally different.

In one embodiment of the invention the simulation model provides a representation ratio for at least one of (i) a first plurality of the first number of instances of the first component per model instance of the first component in the simulation model and (ii) a second plurality of the second number of instances of the second component per model instance of the second component in the simulation model, wherein the obtaining of the first acceleration factor or the obtaining of the second acceleration factor is further based on the representation ratio. A MC simulator and a simulation system for evaluating a design of an integrated circuit (IC) are also described.

DETAILED DESCRIPTION

Figure 1:
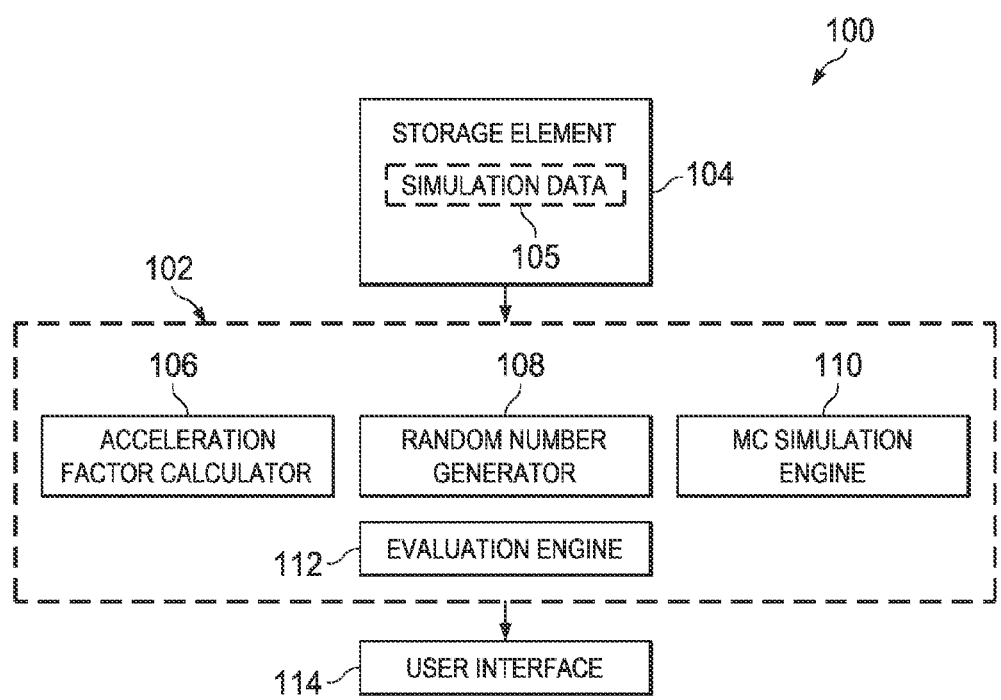
FIG. 1 depicts a block diagram of an exemplary system to accelerate simulation of a system according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

MC methods are a class of computational algorithms that are often used for simulating a system by utilizing repeated random sampling to compute a result. A "system", when referred to herein as being simulated, refers collectively to objects, devices, processes, or any combination thereof, being simulated. MC simulation methods are especially useful in studying systems with significant uncertainty in inputs, such as systems sensitive to variations in environmental, manufacturing, or operating parameters. As previously described, a system design is generally conventionally evaluated by performing a large number of MC simulation runs under various conditions, selected randomly, to verify that the system will perform within some pre-defined specifications regardless of variations in environmental, manufacturing or operating conditions.

In general, simulation of a system design by a MC method is performed by specifying a number of simulation runs and randomly selecting values for an input parameter according to a distribution describing the behavior typically observed or expected for the input parameter in the system. Ideally, the randomly selected values are generally selected from a range commensurate with the number of runs. For example, if 740 simulation runs are to be performed and the input parameter values typically occur in the system according to a normal or Gaussian distribution, randomly chosen input parameter values ideally would be selected from those occurring at a rate of 1 in 740 or higher to produce output values in a 3 sigma range. However, the input parameter values do not generally fall only within such a restricted range during an MC simulation. That is, the exact range of the input parameters values selected will generally vary due to the random selection process and the range of the input parameter values can vary beyond that typically expected for the number of runs. As a result, even though in an exemplary MC simulation consisting of 740 simulation runs there is a high likelihood that many, if not all, of the input parameter values will be within a 3 sigma range, there is also a probability that for one or more of the simulation runs, the randomly selected input values will fall outside this 3 sigma range.

The term "sigma range", as used herein, refers a range above and below the mean of a distribution or population in units of standard deviation. The term "sigma value", as used herein, refers to the distance between any one instance of a population and the population mean in units of standard deviation of the distribution. The term "margin", as used herein, refers to the number of allowed events for a particular number of instances.

In general, conventional MC simulations of a multi-component system may not properly simulate the behavior of a physical system. In particular, because a multi-component physical system typically includes different numbers of instances for each of the different types of components. Therefore, the likelihood of certain failure-inducing conditions occurring in the physical system may be increased, yet such conditions may not be observed during a practical MC simulation which is constrained by a limited number of simulation runs. That is, if the number of instances of a component in the physical system (e.g. bits in a memory array or sense amplifiers associated with a memory array) is sufficiently high, it is likely that input parameter values describing less frequently occurring conditions in the physical system will be outside the input parameter values selected for the MC simulation. For example, if the number of MC iterations is less than the number of instances of a type of component in the physical system, there is a lower likelihood that some sets of input parameters values needed to induce some types of lower frequency failure events in one or more of the components of the physical system will be selected. As a result, some conditions that may normally occur in one or more components of the physical system that can result in failure events may not be tested during an MC. In other words, if the system is of sufficient complexity, conventional MC simulations can result in an insufficient number of simulation conditions being generated to evaluate whether the system has sufficient margin to operate with sufficient reliability for a given application under actual environmental, manufacturing and operating conditions. As a result, the level of confidence in predicting performance of the system is generally low for conventional MC simulations with only a limited number of runs, as the simulation results will generally be too optimistic.

For example, consider an exemplary static random access memory (SRAM) circuit including 3.5 million instances of an SRAM cell to be simulated using an MC simulation including 740 runs. In the physical system, it is highly likely some combinations of input parameters values associated with some types of conditions typically causing failures will fall outside the range of input parameters values that are selected for the 740 MC simulations. Rather, as described above, it is more likely that the randomly selected input parameter values in the 740 iterations will generally fall within the 3 sigma range. In other words, the combinations of input parameter values selected for various the MC simulation runs will principally include those occurring with a probability of 1/740 or greater. In contrast, since 3.5 million SRAM cells are actually present in the exemplary SRAM circuit, there is a high likelihood of conditions existing in the SRAM circuit that are associated with input parameters values that cause events that occur at a probability of 1/3.5 million or greater. That is, input parameter values for events that are typically associated with a 5 sigma range, rather than the 3 sigma range typically associated with 740 runs. Accordingly, if the 740 MC simulations fail to include a sufficient number of input parameters values from across the 5 sigma range, conclusions regarding the margin of the SRAM cells will generally have little meaning.

One conventional solution to this problem has been to increase the number of simulation runs and therefore increase the number and the probable range of input parameter values selected during the MC simulation. However, the number of simulation runs needed for some systems can be time-consuming. For example, in the case of the SRAM circuit described above, over 3 million MC simulation runs are generally needed to provide simulation runs that include input parameter values describing conditions likely to be observed in the SRAM cells in an actual IC. Furthermore, as the number and the probable range of input parameter values selected for the MC simulation is increased, other problems can occur. For example, the variation in selected input parameter values for some components may be greater than what is generally observed in the physical system. Consequently, these results would generally be too pessimistic with respect to such components. For example, in the case of an SRAM circuit, performing over 3 million simulation runs using a corresponding number and range of parameter input values can provide data for accurately evaluating the margin of the SRAM cells in the SRAM circuit. However, for other less frequently occurring components in an SRAM, such as control circuits, row decoders, write line drivers, and sense amplifiers, it is likely that there is a smaller variation in the conditions occurring in the SRAM circuit. As a result, the increased variation in input parameter values for these components results in the MC simulation results typically indicating a higher number of failures associated with such components in the SRAM circuit that would be typically observed in the actual SRAM circuit.

Another conventional solution to this problem has been to simulate only the worst-case scenario for each of the components. That is, utilize only input parameter values associated with worst-case conditions each type of component. However, the probability of worst-case conditions occurring at all of the components simultaneously is very small and the results again would be too pessimistic. A further conventional solution has been to simulate physical systems using one or more sets of nested loops in the MC simulation to add additional simulation of certain components in the system. However, this not only increases the complexity of the design of the MC simulation, but also increases the amount of simulation time required to obtain a result.

The Present Inventors, however, have discovered that for models of systems including different numbers of different types of components, the component and system margins can be effectively evaluated with a limited number of runs by applying component-specific acceleration factors (i.e, relative acceleration factors are used so that one component has one acceleration factor and a second component has a different acceleration factor) during the simulation of each component. In particular, by scaling the input parameter distributions for each component by a component-specific acceleration factor associated with the system design. In embodiments of the present invention, the acceleration factors can be generally based on the number of simulation runs to be performed, the number (instances) of components of each type present in the physical system, and the allowable margin for each type of component.

The acceleration factors selected can also be based on the number of elements of a given component that are represented per element of the component in the simulation. In this embodiment the simulation model can provide a representation ratio for at least one of (i) a first plurality of first number of instances of the first component per model instance of the first component in the simulation model and (ii) a second plurality of the second number of instances of the second component per model instance of the second component in the simulation model. The respective acceleration factors can then be obtained based on the representation ratio.

More specifically, the acceleration for each component in the system can be based on how the simulation is set up as well as the number of instances of the component (e.g. in silicon for an IC). For example, where there are M parallel paths for some coupling component, the simulation can be set up to simulate just one of the paths instead of simulating M paths and taking the worst case of the M. The relative acceleration can be set for the component so that the expected range of variation in the one path in i iterations matches the range that would have been expected if M paths had been simulated at each of the i iterations. In contrast, if there were M times as many of a first component as a second component, but all M of the first component were included in the simulation, no relative acceleration between the first and second component would generally be used.

Accordingly, during the MC simulation, the input parameter values for a particular component is randomly selected according to a modified distribution, comprising a scaled version of the original distribution for the input parameter, where the scaling is generally provided by an acceleration factor that is >1. However, in certain applications one or more components can receive no acceleration (acceleration factor=1) or a de-acceleration (acceleration factor <1), such to prevent excessive failure conditions from occurring.

More specifically, the modified distribution can comprise a distribution described by the mean of the original input parameter distribution for the component and scaled standard deviation of the original input parameter distribution for the component. As a result of this scaling, a different set of input parameter values will be selected for a component that is commensurate with the margin for the component as opposed to a margin associated with the original distribution. For example, in the case of a system having components with input parameters that vary according to a Gaussian distribution, such as an IC, an MC simulation comprising 740 runs will typically generate input parameter values falling principally within a range of 3 sigma, as described above. However, when an acceleration factor of 5/3 is applied to the distribution of input parameter values, the distribution of the values in the 3 sigma range are now effectively spread out over a range of 5 sigma. As a result, selecting values randomly during the 740 iterations from the widened distribution will instead generate input parameter values for the MC simulation that include values suitable for evaluating a margin associated with a 5 sigma value for the component, without the need to increase the number of simulations.

In some embodiments of the present invention, an acceleration factor for each different type of component in the system can be computed separately. The acceleration factor can be based on a ratio of a sigma value or sigma range associated with the allowable margin for the number of components of a particular type in the physical system and the sigma value generally associated with the number of simulation runs to be performed during the MC simulation. For example, for 740 MC simulation runs, the associated sigma value is 3 sigma. For a component being simulated and having a margin of 5 sigma, an acceleration factor of 5/3 would be used to scale the distribution for the behavior of input parameter values for the component. Applying the acceleration factor of 5/3 effectively transforms the 3 sigma range of input values typically associated with the 740 runs into a 5 sigma range of input parameter values. Accordingly, a 5 sigma range margin for the component and/or the system can be properly evaluated, as a sufficient number of combinations of input parameter is selected during the MC simulation.

For example, in the exemplary SRAM circuit simulated using 740 runs described above, the acceleration factor for the SRAM cells could be based sigma values associated with allowed fail, event rate, or probability, for the number of instances of the SRAM cell (3.5 million) and the sigma values associated with 740 runs. Therefore, an exemplary acceleration factor for the SRAM cells in the SRAM circuit described above can be based on the sigma value associated with a margin, an event occurring at a rate of 1 in 3.5 million, or the sigma value associated with 740 simulation runs. Since the behavior of an IC is typically described by a Gaussian (normal) distribution, the Z-score values of a normal distribution can be used compute such sigma values from the probabilities associated with such events. Although the example above uses a margin of one fail or event for a number of components of a type, embodiments of the present invention are not limited in this regard. In embodiments of the present invention, the margin can generally specify any number of fails for any number of runs.

As described above, an exemplary margin for the SRAM cells in the SRAM circuit can be described by a probability associated with one event in 3.5 million instances, which is approximately $2.9 \times 10^{-7}$. This probability corresponds to a Z-score value of approximately 5-sigma. Similarly, the probability of one event in 740 runs is $1.35 \times 10^{-3}$ and corresponds to a Z-score value of approximately 3-sigma. As a result, the applicable acceleration factor for the SRAM cells during the MC simulation would be approximately 5/3 or 1.66. Accordingly, during simulation of an instance of SRAM cell, prior to randomly selecting input parameter values, the distribution of the input parameter values would be scaled by 1.66. That is, the standard deviation of the distribution of the input parameter values for modeling the SRAM cells in the MC simulation is scaled by 1.66. The input parameter values for the simulation run are then selected utilizing on the resulting widened distribution. Similarly, relative acceleration factors can all be different for other components in the SRAM circuit (e.g. sense amplifiers, timing circuits, word line drivers) can be calculated based on the margin for the number of instances of each additional component in the SRAM circuit. In one embodiment of the invention, the acceleration factors selected for respective components in the simulation can also be based on representation ratios which as described above relate the number of instances of the respective component per model instance of the respective component in the simulation model.

As described above, the acceleration factors for the respective components selected can also be based on the number of elements of a given component that are represented per element of the component in the simulation.

Although embodiments of the present invention will be described with respect to a few exemplary embodiments, the present invention can be embodied in many different forms and should not be construed as limited to the embodiments set forth herein. For example, the present invention can be embodied as a method, an apparatus, or a computer program product. Accordingly, the present invention can take the form as an entirely hardware embodiment, an entirely software embodiment or a hardware/software embodiment.

FIG. 1 depicts a block diagram for an exemplary apparatus 100 to accelerate simulation of a system or process according to an embodiment of the present invention. For example, the apparatus 100 can be utilized to accelerate simulation of an IC or a portion thereof, such as one or more circuit components. For example, in one embodiment, the apparatus 100 can be used to evaluate the reliability of a particular SRAM array design in which the failure rates of the various components is known or has been estimated.

The apparatus 100 includes a processing system 102 communicatively coupled to a storage element 104 for storing simulation data 105 for the system being simulated. The simulation data can include a simulation model, simulation parameters, and system information for the system being simulated. The simulation parameters, include but are not limited to the number of simulation runs desired, modeling conditions (e.g., input parameter distributions for the various components), and system and/or component margins. The simulation parameters can also define representation ratios which as described above relate the number of instances of the respective component per model instance of the respective component in the simulation model. The system information includes component identification in the system, the manner in which the respective components are coupled to one another and the number of instances for respective components in the system.

The simulation model can describe an operating characteristic, a physical characteristic, or condition of a system or process for which simulation is desired. For example, in the case of an IC including MOS transistor devices, the simulation model can include models that describe the relationships between the channel lengths, the channel widths, and the threshold voltages for the MOS transistors, as well as any other physical characteristics associated with the IC or a component thereof. The simulation model can also describe the effect on the IC of operating voltages, temperatures, and any other external conditions. The simulation data 105 can be stored in the storage element 104 as a plurality of parameters. Although the exemplary embodiments of the present invention will be described with respect to an IC, the various embodiments of the present invention are not limited to simulation of ICs. In the various embodiments of the present invention, any type of system can simulated, including manufacturing processes, physical or chemical processes, or any type of object or device designs.

The processing system 102 can include an acceleration factor calculator (AFC) 106, a random number generator (RNG) 108, a MC simulation engine 110, and an evaluation engine 112. The AFC 106 can be programmed and/or configured to analyze the simulation data in the storage element 104 to calculate one or more acceleration factors for one or more portions of the system. Calculation of acceleration factors is described in more detail below with respect to FIG. 4. The MC simulation engine 110 can utilize the simulation data, the acceleration factors, and values generated by the RNG 108 to accelerate the simulation of the system. For example, the RNG 108 can be utilized to randomly select probability values between a range of 0 to 1 and these random probability values can be used to select points within the distribution associated with an input parameter for a component. In another example, the RNG 108 can be used to generate random sigma values, and these random sigma values can be used to select points within the distribution associated with an input parameter for a component. Once the simulations are completed by the MC simulation engine 110, the output can be analyzed by an evaluation engine 112 to determine the reliability of the system design without the need to increase the number of simulation runs to account for frequently occurring components. The results can then be reported via a user interface 114 communicatively coupled to the processing element 102.

For example, computer automated engineering (CAE) tools exist to analyze and test operation of an IC according to a simulation model that describes a given IC design. Such simulation models can describe an IC circuit in terms of the number and types of components (i.e., sub-circuits) in the IC circuit, where each component is described by a sub-circuit model comprising an electrical model of the component. Such tools can be employed to ascertain a reliability of the circuit based on one or more IC specifications, which can be provided by the manufacturer. Generally, any commercially available or proprietary circuit simulation tools, such as SPICE™ and other CAE tools for IC design, can be employed to implement such a simulation. When such models are used with the apparatus 100, apparatus 100 can provide results indicative of reliability (e.g., a failure rate) based on estimated variations in manufacturing or operation for each portion of the IC without the need to increase the number of simulation runs. However, as previously described, the present invention is not limited to solely MC simulation of IC designs and can be used to determine the reliability of any type of system design.

Figure 2:
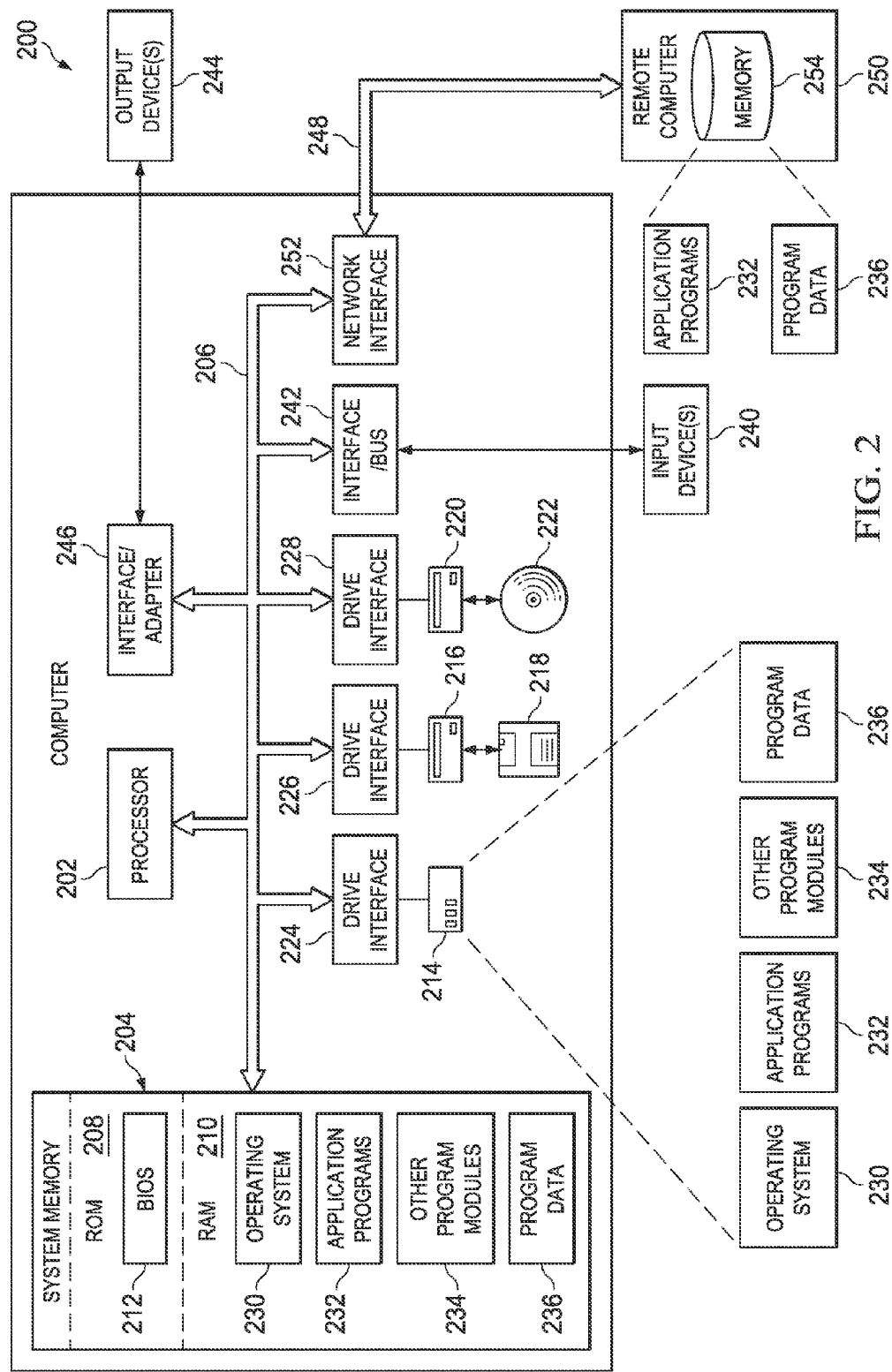
FIG. 2 is an exemplary computer system that can be employed to implement one or more methods according to embodiments of the present invention.

FIG. 2 is an exemplary computer system 200 that can be employed to implement a method according to an embodiment of the present invention, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 including BIOS 212 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, can also be used. For example, computer executable instructions for implementing systems and methods described herein can also be stored in magnetic cassettes, flash memory cards, digital video disks and the like.

A number of program modules can also be stored in one or more of the drives as well as in the RAM 210, including an operating system 230, one or more application programs 232, other program modules 234, and program data 236. For example, the application programs 232 can include executable instructions programmed to accelerate simulation, which further can be implemented as part of a CAE tool. Thus, as part of a design process for an IC, a circuit analysis tool (e.g., SPICE) can implement a function call to appropriate instructions to store the input parameter values selected and modify them, according to the various acceleration factors, prior to running the analysis. The input parameter values can be stored as part of the program data 236, or, alternatively, as part of an application program 232 for future simulations. By running the circuit analysis or simulations based on the stored input parameter values, the need for generating input parameter values can be reduced. The application programs 232 further contains code operative to restore the input parameter values after the simulation runs have been performed.

A user can enter commands and information into the computer system 200 through user input device 240, such as a keyboard, a pointing device (e.g., a mouse). Other input devices can include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output devices 244, such as a visual display device or printer, can also be connected to the system bus 206 via an interface/adapter 246.

The computer system 200 can operate in a networked environment using logical connections 248 to one or more remote computers 250 having memory 254. The remote computer 250 can be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, can be stored in memory 254 of the remote computer 250.

Figure 3:
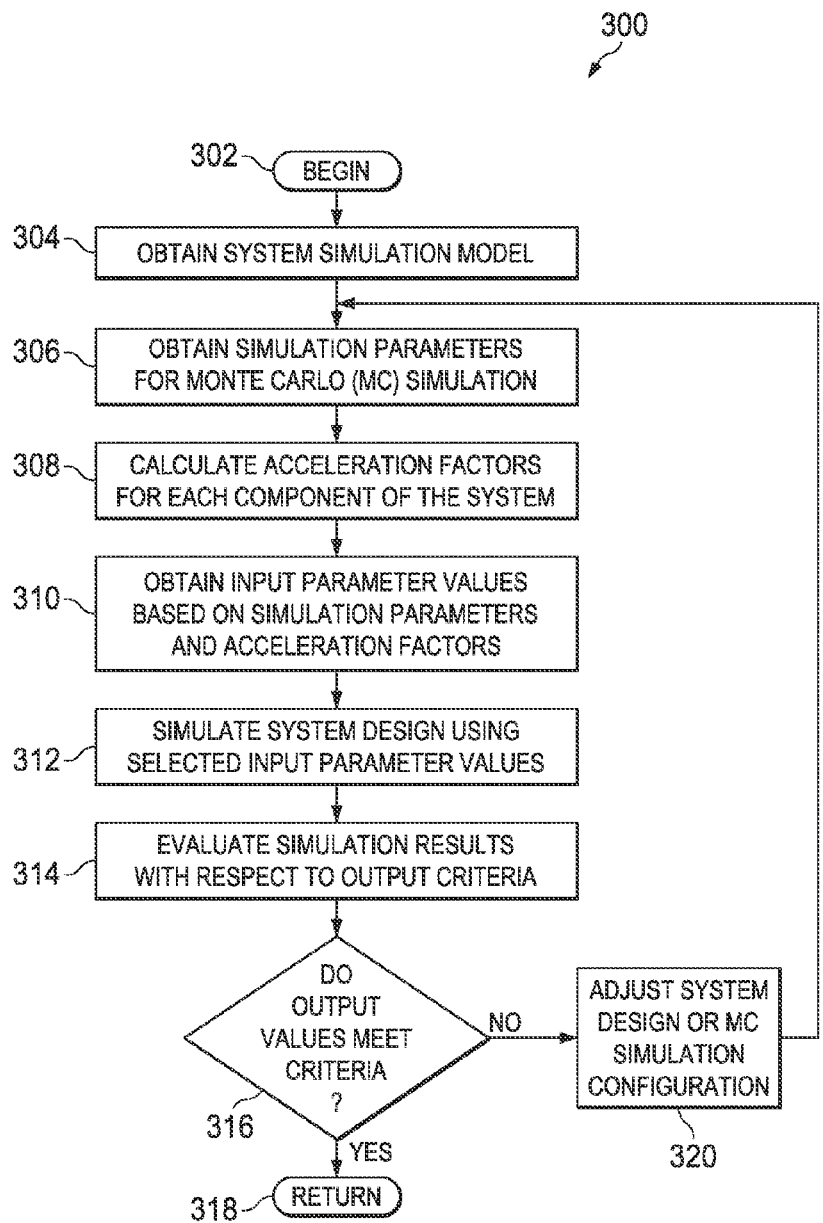
FIG. 3 is flow diagram depicting an exemplary MC simulation of a system using relative acceleration according to an embodiment of the present invention.

FIG. 3 is flow diagram depicting an exemplary method 300 for performing a MC simulation of a system using relative acceleration according to an embodiment of the present invention. The method 300 can begin in step 302 and continue to step 304. In step 304, the simulation model for the system is provided. As previously described, such a simulation model can comprise a collection of component models that describe the physical and/or operating characteristics of the various components of the system. Furthermore, in embodiments of the present invention, each of the component models can include at least one input parameter.

Concurrently or subsequent to step 304, the simulation parameters are provided in step 306. As previously described, the simulation parameters can specify how the simulation is to be performed. That is, the simulation parameters can describe the various inputs required for simulating the system, as well as any external parameters that can affect operation of the system. The simulation parameters can specify the number of simulation runs desired, margins for the various types of components, and the distributions (e.g., mean and standard deviation) of input parameter for the various components in the system. The simulation parameters can also specify output parameter criteria and component and/or system margins for evaluating the simulation results. In other words, the simulation parameters provided in step 306 are the parameters that a user would provide for a conventional MC simulation and the subsequent evaluation of the system. For example, in the case of an IC, the simulation parameters could specify bias conditions for the IC, input signals, operating temperatures, component margins, input parameter distributions, and output parameter criteria, to name a few. As described above, the simulation parameters can also define representation ratios for the respective components.

In step 308, the method 300 continues by calculating acceleration factors for each of the various components in the physical system. As described above, the respective acceleration factors are generally based on the margin for the number of instances of each component in the system being simulated, the number of simulation runs, and as described above can also be based the number of elements per component that are represented per element for the component in the simulation. Calculation of the acceleration factors will be described in further detail below with respect to FIG. 4.

Once the acceleration factors are calculated in step 308, the MC simulation selects the various the input parameter values for the MC simulation in step 310. The input parameter values can be based on the simulation parameters obtained in step 306 and the acceleration factors calculated in step 308. That is, the input parameter values are selected randomly based on the scaled version of probability distributions specified for the various components in the simulation data. The input parameter values selected are generally all associated with different sigma values in the scaled distribution.

Once the input parameters for the MC simulation are calculated in step 310, the MC simulation can be performed in step 312 based on the simulation model obtained in step 304 and the input parameter values selected in step 310. Once the simulation results are obtained in step 312 for all the MC simulation runs, evaluation of the simulation results, with respect to output criteria for evaluating the system design, can be performed starting with step 314. That is, the simulation results can be evaluated at step 314 to see if output criteria is met by the current system design. For example, the results of at least one output parameter of interest from all MC simulation runs can be compared to one or more threshold values specifying the output criteria. Alternatively, the mean or standard deviation of one or more output parameters of interest from all the MC simulation runs can also be evaluated and compared to output criteria.

In step 316, if the evaluation in step 314 indicates that the design meets the criteria specified at step 314, the system design is determined to be acceptable and the method 300 can resume processing at step 318. If the output parameters fail to meet the output criteria at step 316, the system design, the system model, and/or the simulation parameters can be adjusted at step 320. The method 300 can then repeat the MC simulation starting with step 306 until the output criteria is met.

Figure 4:
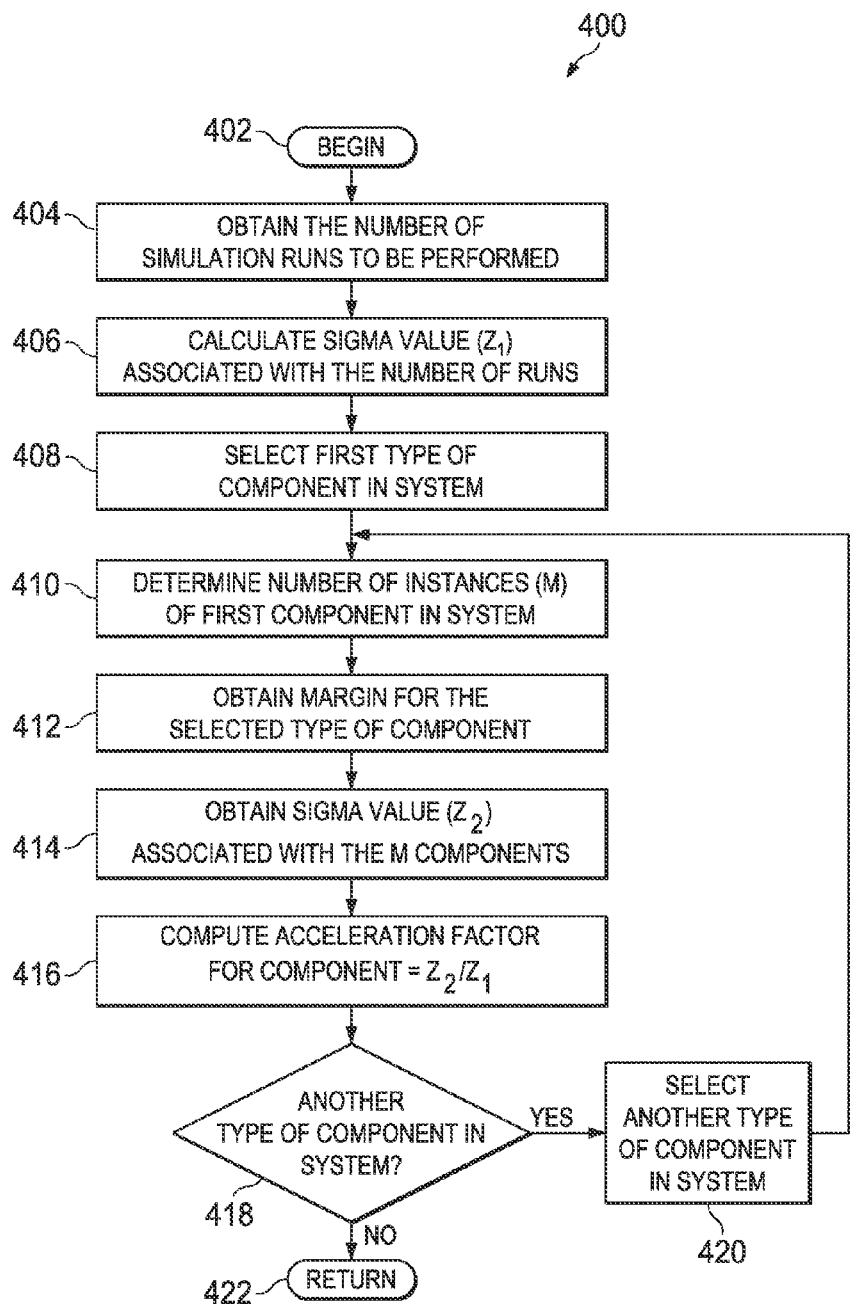
FIG. 4 is a flow diagram depicting an exemplary method for calculating relative acceleration factors for performing the accelerated MC simulation described relative to FIG. 3, in accordance with an embodiment of the present invention.

FIG. 4 is a flow diagram depicting an exemplary method 400 for calculating relative acceleration factors for performing the accelerated Monte Carlo simulation described relative to FIG. 3. The method 400 can begin in step 402 and can proceed to step 404 where the number of simulation runs to be performed is obtained. The number of simulation runs to be performed can be obtained, for example, from the simulation parameters specified in step 306 in FIG. 3. Afterwards, in step 406, the sigma value associated with the number of runs to be performed is obtained. That is, the sigma value ($Z_1$) associated with a probability $P_1=1/$(number of runs) can be obtained. For example, for 740 runs, $P_1$ is equal to 1/740 or $1.35 \times 10^{-3}$. The corresponding sigma value can then be computed for $P_1$. For example, in the case of a Gaussian or normal distribution, the Z-score for $P_1$ can be obtained as the sigma value. In the case of 740 runs in an IC, a Z-score value of 3 sigma is obtained.

Once $Z_1$ is calculated at step 406, then the acceleration factors for each of the components in the system being simulated can be calculated. First, in step 408, a first type of component in the system can be selected. Types of components include both components having structural differences, operational differences, or both. Components can have structural differences when they have a different physical configuration. For example, in the exemplary SRAM circuit, a SRAM cell is structurally different from sense amplifiers, control circuitry, row decoders, and write line drivers in the SRAM circuit. Components can have operational differences when a different group or range of input parameters is used to operate the component. For example, if different instances of a particular sub-circuit in an IC are operated using different operating voltage levels (e.g., 1.1V and 3.3V for low and high power sub-circuits, respectively), these can be considered different types of components, as they operate under different sets of conditions.

Following the selection of the component type in step 408, the number of instances (M) of the component type in the system can be determined at step 410. The number of instances can be determined in method 400 in a variety of ways. For example, the number of instances of the selected component type can be calculated directly from the system model provided. In still another example, the number of instances of the component type can be provided prior to the MC simulation in the simulation parameters. Subsequently or in combination with step 410, the margin for the selected type of component is obtained at step 412.

Once the number of instances for the selected component type is determined at step 410 and the margin for the component is obtained at step 412, the sigma value associated with the M components of the selected type ($Z_2$) is obtained at step 414. That is, the sigma value ($Z_2$) associated with a probability of $P_2=$(allowable events or margin)/(M) can be obtained. For example, for M=3.5 million and one allowable event, $P_2$ is equal to 1/(3.5 million) or $2.9 \times 10^{-7}$. The corresponding sigma value ($Z_2$) can then be computed for $P_2$. For example, in the case of a Gaussian or normal distribution, such as generally present for an IC, the Z-score for $P_2$ can be obtained as the sigma value ($Z_2$). Therefore, in the case of one event allowed for 3.5 million instances, a Z-score value of 5 sigma is obtained.

Once the sigma value ($Z_2$) for the selected component type is obtained at step 414, the acceleration factor for the selected component can be computed at step 416 as $Z_2/Z_1$. For example, the SRAM cells described above, $Z_1=3$, $Z_2=5$ and the acceleration factor is $Z_2/Z_1=5/3$ or 1.66. After the acceleration factor for the selected component is calculated at step 416, additional acceleration factors, if necessary, can be calculated for other components in the system. Therefore, if at step 418, at least one other type component is present in the system, the other type of component can be selected at step 420. Afterwards, an acceleration factor for other components can be calculated by repeating steps 410-420, until acceleration factors for all component types have been calculated. If, however, no additional types of components are present in the system at step 418, the method 400 can proceed to step 422 and return to previous processing.

An exemplary set of acceleration factors for some components in an exemplary SRAM circuit, calculated according to an embodiment of the present invention, is shown below in Table 1. In Table 1, an MC simulation comprising 740 runs and a margin of 1 allowable event for the total number of components of a type is assumed. The acceleration factors for each of the exemplary components are then:

TABLE 1

| SRAM circuit component | Number of instances of the component (M) in the SRAM circuit | Probability Associated with a margin of 1 event in M instances of the component | Sigma value for Margin for M components | Acceleration Factor for the component |
|---|---|---|---|---|
| Control Circuitry | 740 | $1.35 \times 10^{-3}$ | ~3 | 3/3 = 1 |
| Row Decoder | 3,500 | $2.8 \times 10^{-4}$ | ~4 | 4/3 = 1.33 |
| SRAM Cell | 3.5 million | $2.9 \times 10^{-7}$ | ~5 | 5/3 = 1.66 |

As seen above in Table 1, the acceleration factors are all $\geqq 1$ to provide a same or wider distribution of input parameter values. However, the present invention is not limited in this regard and acceleration factors can be less than one. For example, if the number of runs is substantially greater than the number of components in the system, an acceleration factor of less than 1 can be used to provide a narrower distribution of input parameter values. That is, the simulation is "de-accelerated" to prevent excessive failure conditions from occurring, as described above.

Although the various embodiments of the present invention have been described with respect to determining acceleration factors individually for each type of components, in some embodiments of the present invention, additional acceleration factors can be calculated to provide an additional amount of uniform acceleration for all components. For example, the exemplary margins calculated above are based on allowing one fail in M components. Such a configuration provides a basic test configuration the system design. Therefore, as long as the output of the simulation provides, at the most, only one run in which the output parameters associated with a component of interest fall outside a specification range or exceed a threshold limit, the system design is believed to be operable for its application. However, because input parameter values are selected randomly during an MC simulation, there is a possibility that the selected input parameter values that can occur in the physical system may not be selected. For example, in the case of the SRAM circuit, the input parameter values, when scaled by an acceleration factor for the SRAM cell, may only provide input parameters values associated with a 1 in 3 million event, as opposed to a 1 in 3.5 million event. As a result, some types of failures may not be observed.

Therefore, in some embodiments of the present invention, a uniform acceleration can be provided to increase the sensitivity of the simulation. The uniform acceleration can be used to widen the distribution of input parameters for all components simultaneously, and can increase the probability of obtaining multiple combinations of input parameter values resulting in being able to simulate more types of event. As a result, the additional conditions can allow a more robust assessment of the system design by providing additional information for determining when failure-inducing conditions are likely to occur. Such a uniform acceleration can be applied by applying a second uniform acceleration factor to the acceleration factors for the different components.

These are but a few examples. Accordingly, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings.

In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention can have been disclosed with respect to only one of several implementations, such feature can be combined with one or more other features of the other implementations as can be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A method of accelerating a Monte Carlo (MC) simulation of a system comprising at least first component having at least a first input parameter and at least a second component having at least a second input parameter, said first input parameter varying according to a first distribution characterized by at least a first standard deviation, and said second input parameter varying according to a second distribution characterized by at least a second standard deviation, the method comprising:

providing a simulation model for said system, said simulation model comprising a first component model for said first component and a second component model for said second component, said first component model having a first model parameter corresponding to said first input parameter, and a second component model having a second model parameter corresponding to said second input parameter;

obtaining a first acceleration factor based at least on a first number of instances of said first component in said system and obtaining a second acceleration factor based at least on a second number of instances of said second component in said system;

computing a first scaled distribution from said first distribution based on at least said first acceleration factor and computing a second scaled distribution from said second distribution based on at least said second acceleration factor, and running said MC simulation for said system, wherein values for said first model parameter are generated based on said first scaled distribution and said values for said second model parameter value are obtained based on said second scaled distribution.

2. The method of claim 1, wherein said first number of instances and said second number of instances are different.

3. The method of claim 1, wherein said simulation model provides a representation ratio for at least one of (i) a first plurality of said first number of instances of said first component per model instance of said first component in said simulation model and (ii) a second plurality of said second number of instances of said second component per model instance of said second component in said simulation model, and wherein said obtaining said first acceleration factor or said obtaining said second acceleration factor is further based on said representation ratio.

4. The method of claim 1, further comprising:

receiving simulation data specifying a number of runs for said MC simulation, and wherein said obtaining further comprises calculating said first acceleration factor as a ratio of a first component sigma value associated with a first margin for said first number of instances and a sigma value associated with said number of runs, and calculating said second acceleration factor as a ratio of a second component sigma value associated with a second margin for said second number of instances and said sigma value associated with said number of runs.

5. The method of claim 4, wherein said first and said second distributions are Gaussian, wherein said first component sigma value comprises a first Z-score for said first margin, and wherein said second component sigma value comprises a second Z-score for said second margin.

6. The method of claim 4, wherein said sigma value associated with said number of runs comprises a Z-score associated with a probability of one event in said number of runs.

7. The method of claim 1, wherein said simulation model comprises an electrical model for integrated circuit, said first component model comprises an electrical model for at least a first portion of said integrated circuit and said second component model comprises at least a second portion of said integrated circuit.

8. The method of claim 1, further comprising:
obtaining a third acceleration factor, and
wherein said computing said first scaled distribution is further based on at least said third acceleration factor, and wherein said computing said second scaled distribution is further based on at least said third acceleration factor.

9. A Monte Carlo (MC) simulator, comprising:
a storage element for receiving a simulation model of a system comprising at least first component having at least a first input parameter and at least a second component having at least a second input parameter, said simulation model comprising a first component model for said first component and a second component model for said second component, said first component model having a first model parameter corresponding to said first input parameter, and a second component model having a second model parameter corresponding to said second input parameter, said first input parameter varying according to a first distribution characterized by at least a first standard deviation, and said second input parameter varying according to a second distribution characterized by at least a second standard deviation,
a processing element for performing an MC simulation of said system and communicatively coupled to said storage element, said processing element configured for obtaining a first acceleration factor based at least on a first number of instances of said first component in said system and obtaining a second acceleration factor based at least on a second number of instances of said second component in said system, computing a first scaled distribution from said first distribution based on at least said first acceleration factor and computing a second scaled distribution from said second distribution based on at least said second acceleration factor, and selecting values for each run of said MC simulator, wherein values for said first model parameter value are selected according to said first scaled distribution and said values for said second model parameter value are selected according to said second scaled distribution.

10. The simulator of claim 9, wherein said simulation model provides a representation ratio for at least one of (i) a first plurality of said first number of instances of said first component per model instance of said first component in said simulation model and (ii) a second plurality of said second number of instances of said second component per model instance of said second component in said simulation model, and
wherein said obtaining said first acceleration factor or said obtaining said second acceleration factor is further based on said representation ratio.

11. The simulator of claim 10, wherein said storage element is further configured for receiving simulation data specifying a number of runs for said MC simulation, and wherein said processing element is further configured for calculating said first acceleration factor as a ratio of a first component sigma value associated with a first margin for said first number of instances and a sigma value associated with said number of runs, and calculating said second acceleration factor as a ratio of a second component sigma value associated with a second margin for said second number of instances and said sigma value associated with said number of runs.

12. The simulator of claim 11, wherein said first and said second distributions are Gaussian, wherein said processing element is further configured for computing said first component sigma value as a first Z-score for said first margin and computing said second component sigma value as a second Z-score for said second margin.

13. The simulator of claim 12, wherein said processing element is further configured for computing said sigma value associated with said number of runs as a Z-score associated with a probability of one event in said number of runs.

14. The simulator system of claim 10, wherein said processing element is further configured for obtaining a third acceleration factor, computing said first scaled distribution based on at least said third acceleration factor, and computing said second scaled distribution based on at least said third acceleration factor.

15. A simulation system for evaluating a design of an integrated circuit (IC), comprising:
a storage element for a receiving a simulation model for said IC, said simulation model comprising a first electrical model for a first sub-circuit of said IC having a first input parameter and a second electrical model for a second sub-circuit of said IC having a second input parameter, said first electrical model having a first model parameter corresponding to said first input parameter; and a second electrical model having a second model parameter corresponding to said second input parameter, said first input parameter varying according to a first distribution characterized by at least a first standard deviation, and said second input parameter varying according to a second distribution characterized by at least a second standard deviation; and
a processing element communicatively coupled to said storage element and configured for:
obtaining a first acceleration factor based at least on a first number of instances of said first sub-circuit in said IC and obtaining a second acceleration factor based at least on a second number of instances of said second sub-circuit in said IC;
computing a first scaled distribution from said first distribution based on at least said first acceleration factor and computing a second scaled distribution from said second distribution based on at least said second acceleration factor;
selecting input parameter values for a number of simulation runs, wherein values for said first model parameter value are selected according to said first scaled distribution and said values for said second model parameter value are selected according to said second scaled distribution;
obtaining a plurality of output values for at least one output parameter of said IC based at least on said simulation model, said input parameter values, and said number of simulation runs, and
characterizing said IC design based on a number of said plurality of output values and at least one output criteria.

16. The simulation system of claim 15, wherein said simulation model provides a representation ratio for at least one of (i) a first plurality of said first number of instances of said first sub-circuit per model instance of said first sub-circuit in said simulation model and (ii) a second plurality of said second number of instances of said second sub-circuit per model instance of said second sub-circuit in said simulation model, and wherein said obtaining said first acceleration factor or said obtaining said second acceleration factor is further based on said representation ratio.

17. The simulation system of claim 15, wherein said processing element is further configured to calculate said first acceleration factor as a ratio of a first sub-circuit sigma value associated with a first margin for said first number of instances and a sigma value associated with said number of runs, and calculating said second acceleration factor as a ratio of a second sub-circuit sigma value associated with a second margin for said second number of instances and said sigma value associated with said number of runs.

18. The simulation system of claim 17, wherein said processing element is further configured for computing said first sub-circuit sigma value as a first Z-score for said first margin and computing said second sub-circuit sigma value as a second Z-score for said second margin.

19. The simulation system of claim 17, wherein said processing element is further configured for computing said sigma value associated with said number of runs as a Z-score associated with a probability of one event in said number of runs.

20. The simulation system of claim 15, wherein said processing element is further configured for obtaining a third acceleration factor, computing said first scaled distribution further based on at least said third acceleration factor, and computing said second scaled distribution further based on at least said third acceleration factor.

* * * * *